United States Patent
Spehl et al.

(10) Patent No.: US 10,812,128 B2
(45) Date of Patent: Oct. 20, 2020

(54) SYSTEM AND METHOD FOR EXCHANGING INFORMATION

(71) Applicant: AUDI AG, Ingolstadt (DE)

(72) Inventors: Jürgen Spehl, Wettstetten (DE); Andreas Pohl, Denkendorf (DE); Aurel Papp, Karlskron (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/323,701

(22) PCT Filed: Jul. 24, 2017

(86) PCT No.: PCT/EP2017/068676
§ 371 (c)(1),
(2) Date: Feb. 6, 2019

(87) PCT Pub. No.: WO2018/036735
PCT Pub. Date: Mar. 1, 2018

(65) Prior Publication Data
US 2019/0207641 A1   Jul. 4, 2019

(30) Foreign Application Priority Data

Aug. 10, 2016  (DE) .................. 10 2016 214 855

(51) Int. Cl.
*H04B 1/44* (2006.01)
*H04B 1/40* (2015.01)
(Continued)

(52) U.S. Cl.
CPC ............ *H04B 1/44* (2013.01); *H04B 1/0003* (2013.01); *H04B 1/3822* (2013.01); *H04B 1/40* (2013.01); *H04B 7/26* (2013.01)

(58) Field of Classification Search
CPC ..... H04B 1/44; H04B 1/00034; H04B 1/3822
(Continued)

(56) References Cited

U.S. PATENT DOCUMENTS 8,838,383 B2   9/2014  Stahlin et al.
9,147,353 B1*  9/2015  Slusar .................. G08G 1/0129
(Continued)

FOREIGN PATENT DOCUMENTS

DE    102005029358 A1   6/2006
DE    102010029485 A1   12/2010
(Continued)

OTHER PUBLICATIONS

International Preliminary Report on Patentability directed to related International Patent Application No. PCT/EP2017/068676, completed Sep. 26, 2018, with attached English language translation; 11 pages.

(Continued)

*Primary Examiner* — Yuwen Pan
*Assistant Examiner* — Angelica M Perez
(74) *Attorney, Agent, or Firm* — Sterne, Kessler, Goldstein & Fox P.L.L.C.

(57) ABSTRACT

The present disclosure relates to a system for a motor vehicle for exchanging information with at least one further motor vehicle, wherein the system has a central processing unit with a processing core, which is connected to at least one antenna module, wherein the at least one antenna module is designed to exchange signals containing information with the at least one further motor vehicle, wherein an application for carrying out a motor vehicle to motor vehicle communication is installed in the processing core, wherein the processing core is designed to control the at least one antenna module by carrying out a signal processing.

8 Claims, 5 Drawing Sheets

(51) Int. Cl.
*H04B 7/26* (2006.01)
*H04B 1/00* (2006.01)
*H04B 1/3822* (2015.01)

(58) Field of Classification Search
USPC .......................................................... 455/79
See application file for complete search history.

(56) References Cited

U.S. PATENT DOCUMENTS

| | | | |
|---|---|---|---|
| 9,315,164 | B2 | 4/2016 | Grimm et al. |
| 9,355,423 | B1* | 5/2016 | Slusar .................... G06Q 40/08 |
| 9,639,344 | B2 | 5/2017 | Rockwell et al. |
| 2009/0285135 | A1 | 11/2009 | Rousu et al. |
| 2010/0076670 | A1 | 3/2010 | Turner et al. |
| 2014/0274182 | A1* | 9/2014 | Menzel ................ H04B 7/0871 455/509 |
| 2014/0294180 | A1* | 10/2014 | Link, II ................. G08G 1/205 380/270 |
| 2015/0071139 | A1 | 3/2015 | Nix |
| 2017/0149123 | A1* | 5/2017 | Kim ..................... H01Q 1/3275 |
| 2018/0053404 | A1* | 2/2018 | Horita ..................... B60R 21/00 |
| 2018/0054843 | A1* | 2/2018 | Stahlin .................. H04W 4/027 |

FOREIGN PATENT DOCUMENTS

| | | |
|---|---|---|
| DE | 102015112264 A1 | 2/2016 |
| DE | 102015121091 A1 | 6/2016 |
| WO | WO-2006006076 A2 | 1/2006 |

OTHER PUBLICATIONS

International Search Report and Written Opinion of the International Searching Authority directed to related International Patent Application No. PCT/EP2017/068676, dated Oct. 13, 2017, with attached English-language translation; 25 pages.

* cited by examiner

SYSTEM AND METHOD FOR EXCHANGING INFORMATION

TECHNICAL FIELD

The present disclosure relates to a system and a method for exchanging information between motor vehicles.

Each motor vehicle has a transmitter system provided for the purpose of realizing a communication between motor vehicles. Information and/or data can be exchanged between the motor vehicles in this way.

BACKGROUND

The document US 2010/0076670 A1 describes a system and a method for radio communication between vehicles and other radio nodes, wherein the system communicates with the vehicles via Bluetooth or WLAN.

Document US 2009/0285135 A1 describes a device which is designed to select a radio frequency path, the device for this purpose having a diplexer which is connected via a control interface to different radio modules.

Document DE 10 2015 121 091 A1 describes a computer-implemented method for a vehicle in which software updates which will be installed are received in an electronic control unit of the vehicle. If the software update is compatible, it will be put into active use.

SUMMARY

Against this background, a system and a method having the features of the independent claims are presented. Embodiments of the system and method are evident from the dependent claims and the description.

The system according to the present disclosure for a motor vehicle is designed to exchange information with at least one further motor vehicle, wherein the system has a central processing unit with a processing core, which is connected to at least one antenna module. The at least one antenna module is designed to exchange signals which contain information with the at least one further motor vehicle, wherein an application for carrying out a motor vehicle to motor vehicle communication is installed in the processing core, wherein the processing core is configured to control the at least one antenna module by carrying out a signal processing. In addition, data for communication with the at least one motor vehicle can be exchanged between the processing core and a protocol stack of the central processing unit.

The processing core is connected in each case via a signal transmission module for receiving and/or transmitting signals to the at least one antenna module, the respective signal transmission module having a first switch for receiving and/or transmitting the signals, a first SAW filter, a power amplifier, a low-noise amplifier, a second SAW filter, and a second switch for receiving and/or transmitting the signals.

The at least one antenna module is arranged in a housing of the central processing unit and/or in a separate antenna unit. If the system has only one antenna module, it is arranged in the processing unit. An optional further antenna module is arranged either in the processing unit or the separate antenna unit.

In an embodiment, the system has two antenna modules which are both connected to the processing core, wherein the processing core is designed to control each antenna module by carrying out a signal processing which is carried out for the respective antenna module.

As a rule, the at least one antenna module, and thus each antenna module, is connected to the processing core via an amplifier module.

The method according to the present disclosure is provided for a motor vehicle for exchanging information with at least one further motor vehicle, wherein a central processing unit is used which has a processing core which is connected to at least one antenna module. Signals containing information are exchanged with the at least one further motor vehicle by means of the at least one antenna module. An application for carrying out motor vehicle to motor vehicle communication is installed in the processing core, and the at least one antenna module is controlled by the processing core carrying out a signal processing. In addition, data for a communication with the at least one motor vehicle is exchanged between the processing core and a protocol stack of the central processing unit.

For carrying out the software-supported signal processing, the processing core carries out a software-assisted analog-to-digital conversion, a software-supported digital-to-analog conversion, a software-supported bit transmission using a physical layer simulation, a software-supported media access check, a software-supported media access control, a software-supported logical connection control, and/or software-supported baseband processing.

Furthermore, it is possible that software that is used by the processing core for the software-supported signal processing is updated.

The signals are prepared, filtered, corrected, encoded and/or decoded by the processing core, using software, wherein data used to provide the signals is compressed by the processing core with software support, and/or wherein baseband processing and/or channel adjustment for exchanging the signals with the at least one further motor vehicle is carried out by the processing core, with software support.

In an embodiment, two antenna modules are used, wherein each antenna module is controlled by the processing core carrying out a respective signal processing, wherein a motor vehicle to motor vehicle communication is provided by means of a first antenna module providing a public WLAN, and wherein a motor vehicle to motor vehicle communication is provided by means of a second antenna module via Bluetooth, wherein the first antenna module is controlled by the processing core via a first signal processing, and wherein the second antenna module is controlled by the processing core via a second signal processing.

The system and method provide a means of communication between motor vehicles on the road, wherein a public pWLAN with a frequency of, for example, 5.9 GHz is used. Motor vehicles, each having an embodiment of the system, can communicate with each other and exchange data in this way. In addition, data is exchanged between the vehicles via low-power Bluetooth (BT LE (low energy)) with a frequency of, for example, 2.4 GHz. In this case, for the pWLAN and the low energy Bluetooth, separate antenna modules, separate signal transmission modules, and a shared processing core can be used for the signal processing, in order to satisfy quiescent current requirements. The signal processing module for the pWLAN and for the low-power Bluetooth are each connected directly to the antenna module provided for the purpose. At least one antenna module is, for example, arranged on a roof of the motor vehicle.

The system comprises a universal microcontroller as a processing core, for executing an application for the communication between motor vehicles (Car2Car App-μC), which is merely used and/or integrated into an embodiment of a processing unit of the system, whereby functions for the communication can be carried out (plug & play). A processing unit of one embodiment of the system also comprises a layer for broadcasting (RF front end), a media access control (MAC), a first digital baseband processing and/or baseband processing (BB/DSP), a physical layer (PHY), a network protocol (LLC—logical link control), a protocol stack for carrying out the communication (communication stack), the processing core as an application microprocessor (application μP), a security module, and a connection to a network (CAN) of the motor vehicle.

In an embodiment, the system can be furnished in a basic version, which has only the processing core and further electronic components, wherein only a single channel is used for the transmission of signals between the motor vehicles (pWLAN CCH). Depending on the country in which the system is specifically used, the system is adapted and/or enhanced specifically according to the country. When used in the US, only one transmitter module (TX only) may be activated. Optionally, several channels (dual channel, diversity channel) can be used in the US, with switching back and forth between individual channels (channel switching). Software which is required in the specific case—for example, to perform the signal processing—can be installed in the processing unit, wherein this software can also be updated if necessary—that is, renewed and/or replaced.

Usually, only one antenna module is required, which is installed in the processing unit—for example in a housing and/or on an outer wall of the processing unit. According to requirements, the system comprises at least one further antenna module, which is arranged and/or integrated in an additional embodiment into an additional antenna unit. This additional antenna module is included, for example, if a roof of the motor vehicle is highly curved or is designed as a large glass roof, or if the motor vehicle is designed as a convertible. By way of example, cable losses can be compensated for at a frequency of 6 GHz in this case. The processing unit and the antenna unit are connected via a coaxial cable with a regulated cable compensator. In addition, for a baseband, a digital modulation can be carried out according to an I/Q method.

It should be understood that the features mentioned above and those yet to be explained below can be used not only in the specified combination but also in other combinations or separately, without departing from the scope of the present disclosure.

BRIEF DESCRIPTION OF THE DRAWINGS

Other advantages, features and details of the present disclosure result from the claims, the description of embodiments below, and the drawings, in which:

The figures will be described overall and together. Components which are the same are assigned the same reference numerals.

DETAILED DESCRIPTION

Figure 1:
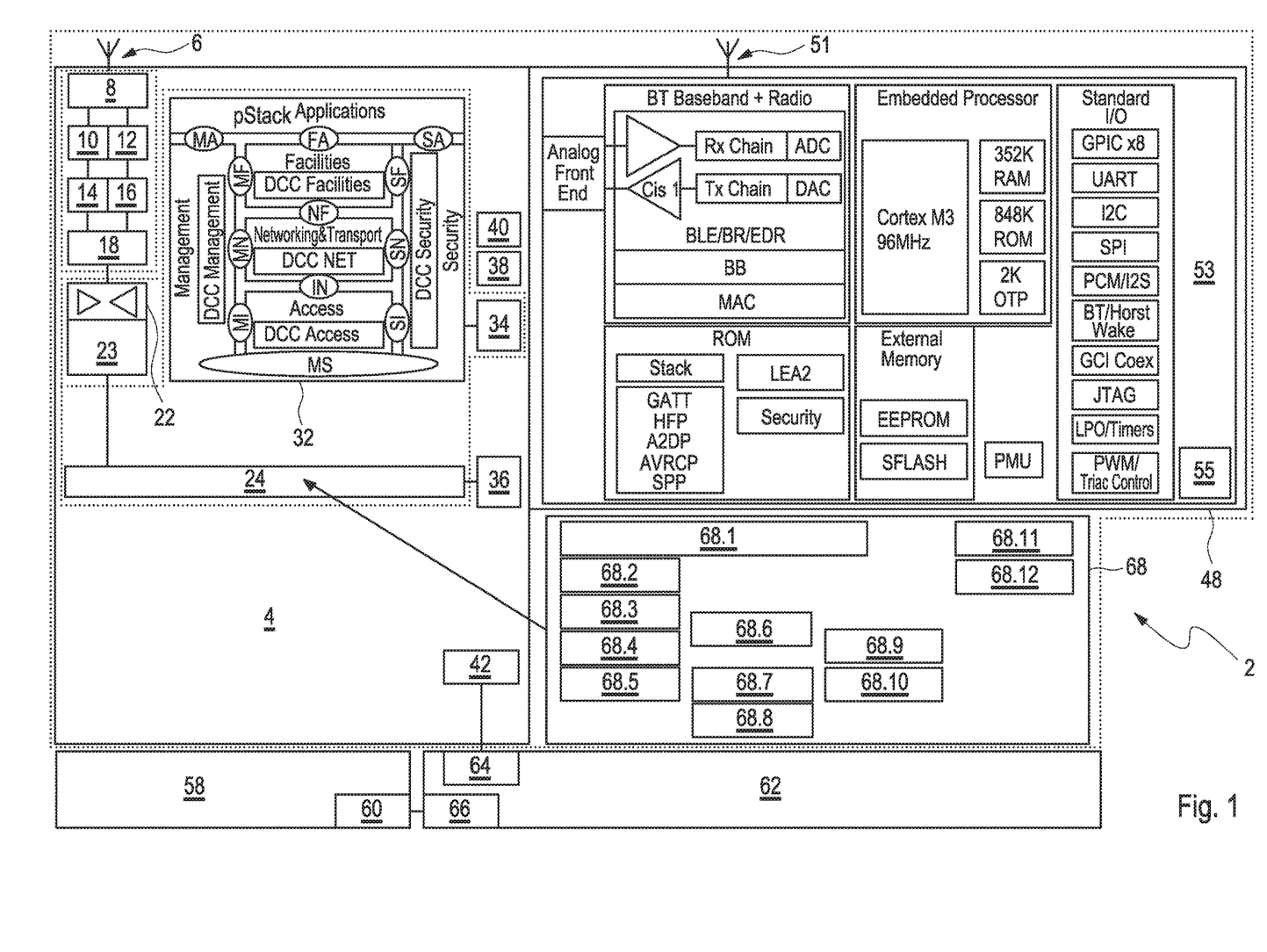
FIG. 1 shows a schematic illustration of an embodiment of an example system according to embodiments of the present disclosure.

The first embodiment of the system 2 for a motor vehicle for carrying out a communication between this motor vehicle and at least one other motor vehicle, schematically illustrated in FIG. 1, comprises a central processing unit 4 (802.11p Car2Car Board). In this case, the processing unit 4 comprises an antenna module 6 for transmitting and receiving signals via electromagnetic waves, which is connected to a first switch 8 for receiving and/or transmitting (Rx/Tx network switch and/or receiver/transceiver switch) the signals. The first switch 8 is upstream of a first SAW filter 10 (surface acoustic filter), a power amplifier 12 (PA), a low noise amplifier 14 (LNA) and a second SAW filter 16. In addition, the processing unit 4 comprises a second switch 18 for receiving and/or transmitting the signals. In this case, the first SAW filter 10, the power amplifier 12, the low-noise amplifier 14 and the second SAW filter 16 are arranged between the two switches 8, 18. In this case, the first switch 8, the first SAW filter 10, the power amplifier 12, the low noise amplifier 14, and the second SAW filter 16 form a signal transmission module for receiving and/or transmitting signals, which is functionally assigned to the antenna module 6. The antenna module 6 and the associated signal transmission module enables a communication over a public WLAN (pWLAN) at a frequency of 5.9 GHz.

The second switch 18 is connected to an amplifier module 22 which is designed to carry out a signal processing 23—inter alia, a synchronization of signals. The amplifier module 22 carries out, as functions for the software-supported signal processing, by way of example, an analog-to-digital conversion (ADC), a digital-to-analog conversion (DAC), a media access control (MAC), and also a first digital baseband processing and/or baseband processing (BB/DSP) of the signals. In addition, the amplifier module 22 provides a physical layer (PHY), a network protocol (LLC—logical link control), and SDIO IF for a signal processing 23—for example, supported by software. The amplifier module 22 is connected to a processing core 24—in this case, a microcontroller—for carrying out an application for the communication between motor vehicles (Car2Car app μC).

The processing unit 4 also comprises a protocol stack 32 (pstack), which in turn is connected to a navigation system 34 for locating the motor vehicle with a global positioning system, such as GPS, a cryptography module 36 designed as an ASIC (application specific integrated circuit), a dynamic memory module 38 designed as a DRAM, and a memory module 40 designed as a flash. The processing unit 4 is connected to a network (CAN) of the motor vehicle via a connection (42).

The protocol stack 32 includes protocols for applications designed as facilities (such as DCC facilities) and stacked consecutively, for providing networking and transport (DCC net, by way of example) or access (DCC access, by way of example). Management (DCC management, by way of example) and security (DCC security, by way of example) are provided for these applications.

Furthermore, the system 2 comprises an antenna unit 48 which comprises an additional antenna module 51. This antenna module 51 is designed to transmit and receive signals via electromagnetic waves, in which case low-power Bluetooth (BT LE) is enabled at a frequency of 4.2 GHz. The antenna unit 48 further comprises a signal processing module 53 and a connection 55 to the network of the motor vehicle.

The signal processing module 53 (BT LE 4.2) comprises as components a BT baseband and a radio with an analog input and/or front-end, a receiver module (Rx chain) with a downstream analog-to-digital converter (ADC), a transmit module (Tx Chain) with an upstream digital-to-analog converter, a digital baseband processing and/or baseband processing (BB), and media access control (MAC). In addition, the signal processing module 53 comprises an embedded processor comprising a 96 MHz clock rate Cortex M3, a 352K EAM, an 848K ROM, and a 2K OTP, a memory (ROM) containing a stack with a GATT, an HFP, an A2DP, an AVRCP and an SPP, as well as an LEA2 and a security module, an external memory with an EEPROM and an SFLASH, a PMU and a standard input and output (I/O) comprising a GPIO, a UART, an I2C, an SPI, a PCM/I2S, a BT/host wake, a GCI Coex, a JTAG, an LPO/timers, and a PWM/triac control.

As further components, the system 2 comprises a human-machine interface 58 which is connected to the network via a connection 60, a coupling module 62 (gateway) with a first connection 64 through which it communicates with the connection 42 of the processing unit via the network 4, and a second connection 66 through which it is connected via the network to the connection 60 of the human-machine interface 58. FIG. 1 also shows a function module 68 of the processing core 24. This function module 68 includes as functional elements applications 68.1, fusion modules 68.2, resources 68.3, a BTP 68.4, geonetworking 68.5, a firewall 68.6, a security module 68.7, an HSM 68.8, a TCP/UDP 68.9, an IPV6 68.10, a positioning module 68.11 and a GPS receiver 68.12.

Figure 2:
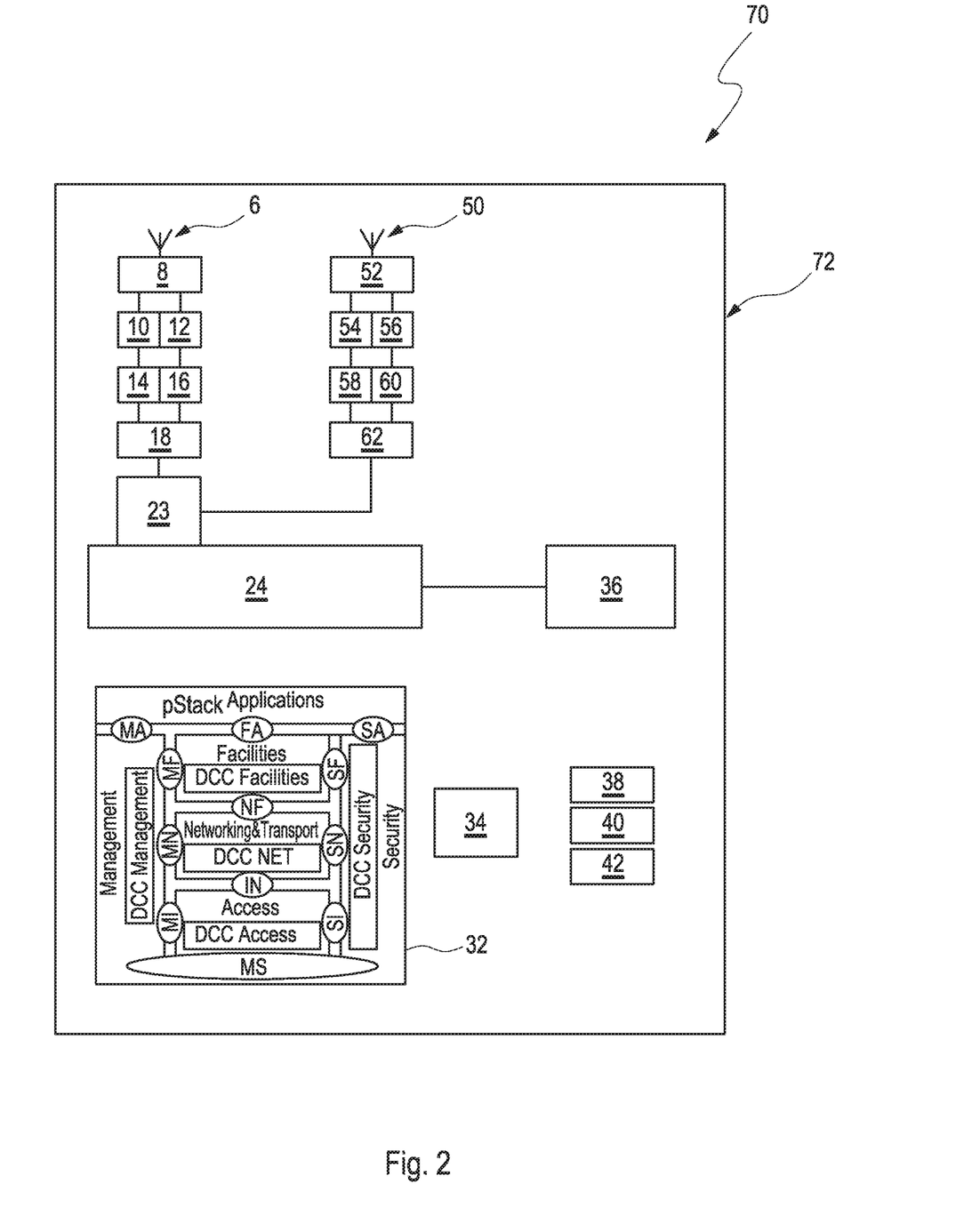
FIG. 2 shows a schematic illustration of an embodiment of an example system according to embodiments of the present disclosure.

The second embodiment of the system 70 is shown schematically in FIG. 2, and comprises a processing unit 72 (802.11p) which likewise comprises an antenna module 6 for transmitting and receiving signals via electromagnetic waves, a first switch 8, a first SAW filter 10, a power amplifier 12, a low noise amplifier 14, a second SAW filter 16, and a second switch 18.

The second switch 18 is connected to a signal processing 23, which is executed here directly by a processing core 24. As functions of the software-supported signal processing 23, the processing core 24 carries out an analog-to-digital conversion (ADC), a digital-to-analog conversion (DAC), a media access control (MAC), and also a first digital baseband processing and/or baseband processing (BB/DSP) of the signals.

The processing unit 72 also includes a protocol stack 32 (pstack) connected to a navigation system 34, a cryptography module 36 designed as an ASIC, a dynamic memory module 38 designed as a DRAM, and a memory module 40 designed as a flash. The processing unit 72 is connected to a network (CAN) of the motor vehicle via a connection 42.

In addition, the processing unit 72 comprises a second antenna module 50 for transmitting and receiving signals via electromagnetic waves, with a first switch 52 for receiving and/or transmitting (Rx/Tx network switch and/or receiver/transceiver network switch) the signals. A first SAW filter 54, a power amplifier 56, a low-noise amplifier 58, and a second SAW filter 60 are connected downstream of the first switch 52. In addition, the antenna unit 48 comprises a second switch 62 for receiving and/or transmitting the signals. The first switch 52, the first SAW filter 54, the power amplifier 56, the low noise amplifier 58, the second SAW filter 60, and the second switch 62 constitute here a signal transmission module for receiving and/or transmitting signals, functionally assigned to the antenna module 50. In this case, the first SAW filter 54, the power amplifier 56, the low-noise amplifier 58, and the second SAW filter 60 are arranged between the two switches 52, 62. The second switch 62 is in turn connected to the signal processing 23 and thus also to the processing core 24. The two antenna modules 6, 50 enable antenna diversity (Rx/Tx diversity), wherein a channel and/or transceiver (CCH) is provided via the processor core 24 for both of the antenna modules 6, 50.

Figure 3:
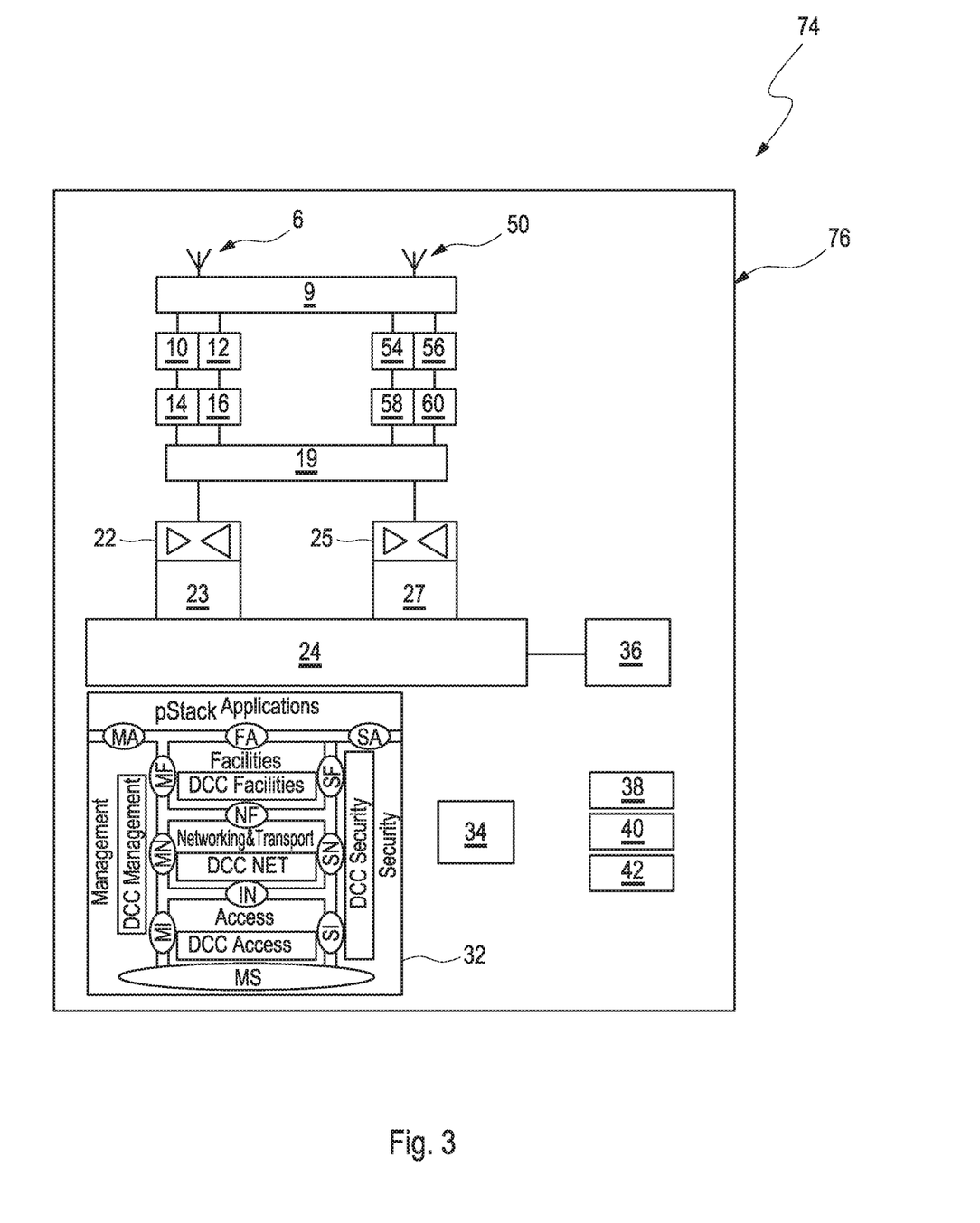
FIG. 3 shows a schematic illustration of an embodiment of an example system according to embodiments of the present disclosure.

The third embodiment of the system 74 for a motor vehicle for carrying out a communication between this motor vehicle and at least one further motor vehicle, shown schematically in FIG. 3, comprises a central processing unit 76 (802.11p Car2Car Board).

In this case, the processing unit 76 comprises a first antenna module 6 and a second antenna module 50, both of which are designed for transmitting and receiving signals via electromagnetic waves, and are connected to a first, shared switch 9 for receiving and/or transmitting (Rx/Tx switch and/or receiver/transceiver switch) the signals. A first SAW filter 10 (surface acoustic filter), a power amplifier 12 (PA), a low-noise amplifier 14 (LNA) and a second SAW filter 16 are downstream of the first, shared switch 9, and are functionally assigned in this case to the first antenna module 6. In addition, the first, shared switch 9, a first SAW filter 54, a power amplifier 56, a low-noise amplifier 58 and a second SAW filter 60 are connected downstream, and are functionally assigned in this case to the first antenna module 50. A second, shared switch 19 is downstream of the first SAW filter 10, the power amplifier 12, the low-noise amplifier, the second SAW filter 16 for the first antenna module 6, and also the first SAW filter 54, the power amplifier 56, the low-noise amplifier 58 and the second SAW filter 60 for the second antenna module 50. The first, shared switch 9, the first SAW filter 10, 54, the power amplifiers 12, 56, the low noise amplifiers 14, 58, the second SAW filter 16, 60 and the second, shared switch 19 in this case form a signal transmission module for receiving and/or sending signals, functionally assigned to the two antenna modules 6, 50 together.

The second, shared switch 19 is connected to a first amplifier module 22 and a second amplifier module 25. The first amplifier module 22 is designed to carry out a signal processing 23—inter alia, a synchronization of signals. In this case, as functions for the software-supported signal processing 23, the first amplifier module 22 carries out, by way of example, an analog-to-digital conversion (ADC), a digital-to-analog conversion (DAC), a media access control (MAC), and also a first digital baseband processing and/or baseband processing (BB/DSP) of the signals. In addition, the first amplifier module 22 furnishes a physical layer (PHY), a network protocol (LLC—logical link control) and SDIO IF for a signal processing 23, supported by software. The second amplifier module 25 is designed to carry out a signal processing 27—inter alia, a synchronization of signals. In this case, as functions for the software-supported signal processing, the second amplifier module 25 carries out an analog-to-digital conversion (ADC), a digital-to-analog conversion (DAC), a media access control (MAC), and also a first digital baseband processing and/or baseband processing (BB/DSP) of the signals. In addition, the second amplifier module 25 furnishes a physical layer (PHY), a network protocol (LLC—logical link control) and SDIO IF for a signal processing 27, supported by software.

Both amplifier modules 22, 25 are connected to a shared processing core 24—in this case, a microcontroller—for carrying out an application for the communication between motor vehicles (Car2Car App μC).

The processing unit 72 also includes the protocol stack 32, which is connected to the navigation system 34, the cryptographic module 36, and both of the memory modules 38, 40. The processing unit 72 is connected via the connection 42 to the network (CAN) of the motor vehicle. The two antenna modules 6, 50 enable antenna diversity (Rx/Tx diversity), wherein a channel and/or transceiver (CCH+SCH) is provided via the processor core 24 for both of the antenna modules 6, 50, and it is possible to switch between the two channels.

Figure 4:
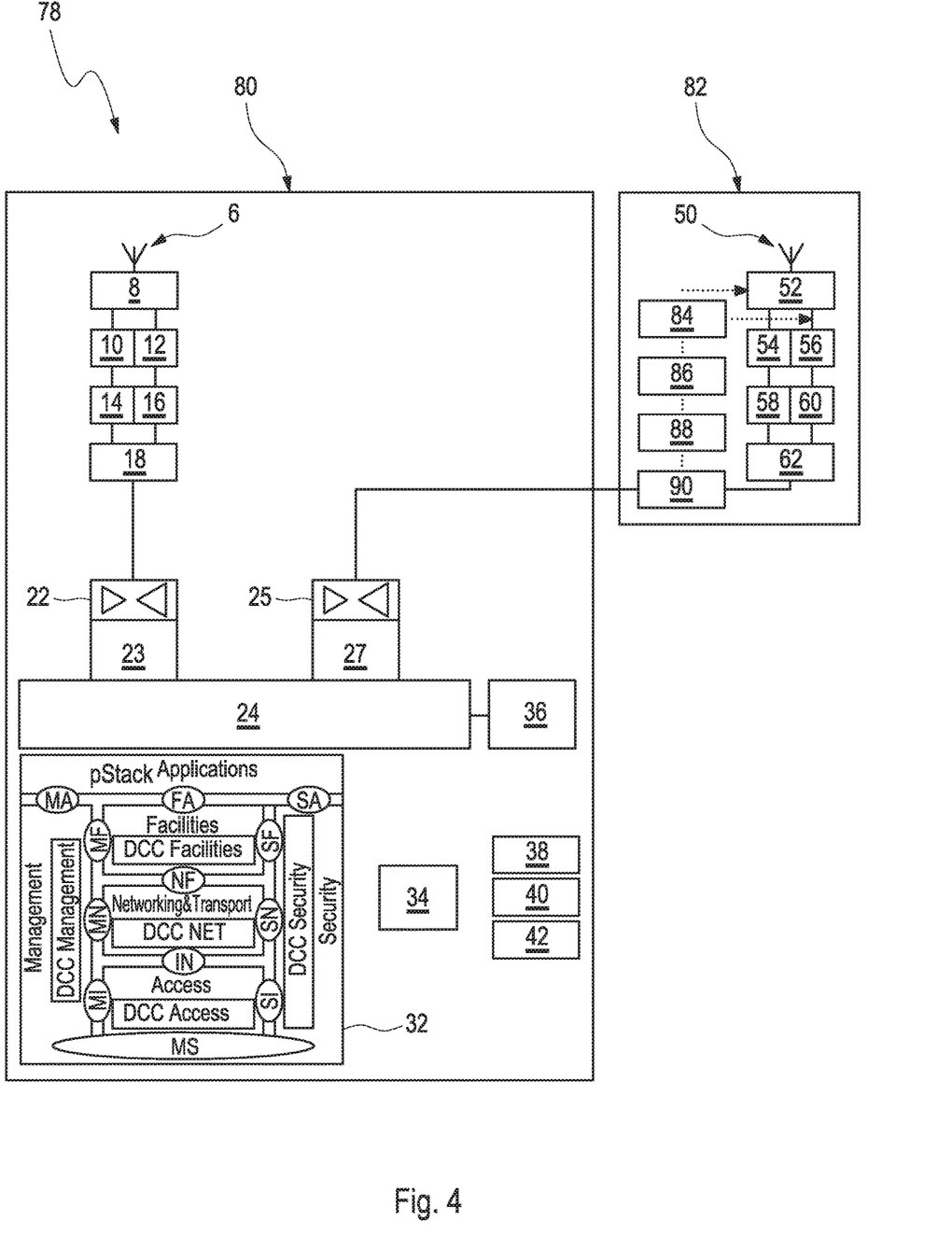
FIG. 4 shows a schematic illustration of an embodiment of an example system according to embodiments of the present disclosure.

The fourth embodiment of the system 78 for a motor vehicle for carrying out a communication between this motor vehicle and at least one further motor vehicle, schematically illustrated in FIG. 4, comprises a central processing unit 80 (COM information board).

In this case, the processing unit 80 comprises an antenna module 6 for transmitting and receiving signals via electromagnetic waves, which is connected to a first switch 8 for receiving and/or transmitting (Rx/Tx switch and/or receiver/transceiver switch) the signals. The first switch 8 is upstream of a first SAW filter 10 (surface acoustic filter), a power amplifier 12 (PA), a low noise amplifier 14 (LNA) and a second SAW filter 16. In addition, the processing unit 80 comprises a second switch 18 for receiving and/or transmitting the signals. In this case, the first SAW filter 10, the power amplifier 12, the low-noise amplifier 14 and the second SAW filter 16 are arranged between the two switches 8, 18. In this case, the first switch 8, the first SAW filter 10, the power amplifier 12, the low noise amplifier 14, and the second SAW filter 16 form a signal transmission module for receiving and/or transmitting signals, which is functionally assigned to the antenna module 6.

The second switch 18 is connected to a first amplifier module 22, which is designed to carry out a signal processing 23. In this case, as functions for the software-supported signal processing, the first amplifier module 22 carries out, by way of example, an analog-to-digital conversion (ADC), a digital-to-analog conversion (DAC), a media access control (MAC), and also a first digital baseband processing and/or baseband processing (BB/DSP) of the signals. In addition, the first amplifier module 22 furnishes a physical layer (PHY), a network protocol (LLC—logical link control) and SDIO IF for a signal processing 23, supported by software. The amplifier module 22 is connected to a processing core 24—in this case, a microcontroller (μC). A second amplifier module 25 of the processing unit is functionally assigned to an antenna unit 82 of the system 78 and designed to carry out a signal processing 27—inter alia, a synchronization of signals.

The processing unit 78 also comprises a protocol stack 32 (stack), which in turn is connected to a navigation system 34 for locating the motor vehicle with a global positioning system, for example GPS, a cryptography module 36 designed as an ASIC (application-specific integrated circuit), and a DRAM dynamic memory module 38 designed as a flash memory device 40. The processing unit 78 is connected via a connection 42 to a network (CAN) of the motor vehicle.

The antenna unit 82 is connected to the processing unit 78 and comprises an antenna module 50 for transmitting and receiving signals via electromagnetic waves with a first switch 52 for receiving and/or transmitting (Rx/Tx switch and/or receiver/transceiver switch) the signals. A first SAW filter 54, a power amplifier 56, a low-noise amplifier 58, and a second SAW filter 60 are connected downstream of the first switch 52. In addition, the antenna unit 82 comprises a second switch 62 for receiving and/or transmitting the signals. The first switch 52, the first SAW filter 54, the power amplifier 56, the low noise amplifier 58, the second SAW filter 60, and the second switch 62 constitute here a signal transmission module for receiving and/or transmitting signals, functionally assigned to the antenna module 50. In this case, the first SAW filter 54, the power amplifier 56, the low-noise amplifier 58, and the second SAW filter 60 are arranged between the two switches 52, 62. The antenna unit 82 also comprises a PWR detector 84, a control module 86, a direct current power supply 88, and a bias T 90, which are connected in series. In this case, the PWR detector 84 is connected to the first switch 52 and the power amplifier 56.

The second, shared switch 62 is connected to the second amplifier module 25 via the bias T 90. In this case, as functions for the software-supported signal processing, the second amplifier module 25 carries out an analog-to-digital conversion (ADC), a digital-to-analog conversion (DAC), a media access control (MAC), and also a first digital baseband processing and/or baseband processing (BB/DSP) of the signals. In addition, an amplifier module 25 furnishes a physical layer (PHY and/or physical layer), a network protocol (LLC and/or logical link control), and SDIO IF for signal processing 27, supported by software.

The two antenna modules 6, 50 enable antenna diversity (Rx/Tx diversity), wherein a channel and/or transceiver (CCH+SCH) is provided via the processor core 24 for both of the antenna modules 6, 50. A connection between the processing unit 80 and the antenna unit 82 is provided via a compensator based on a coaxial cable.

Figure 5:
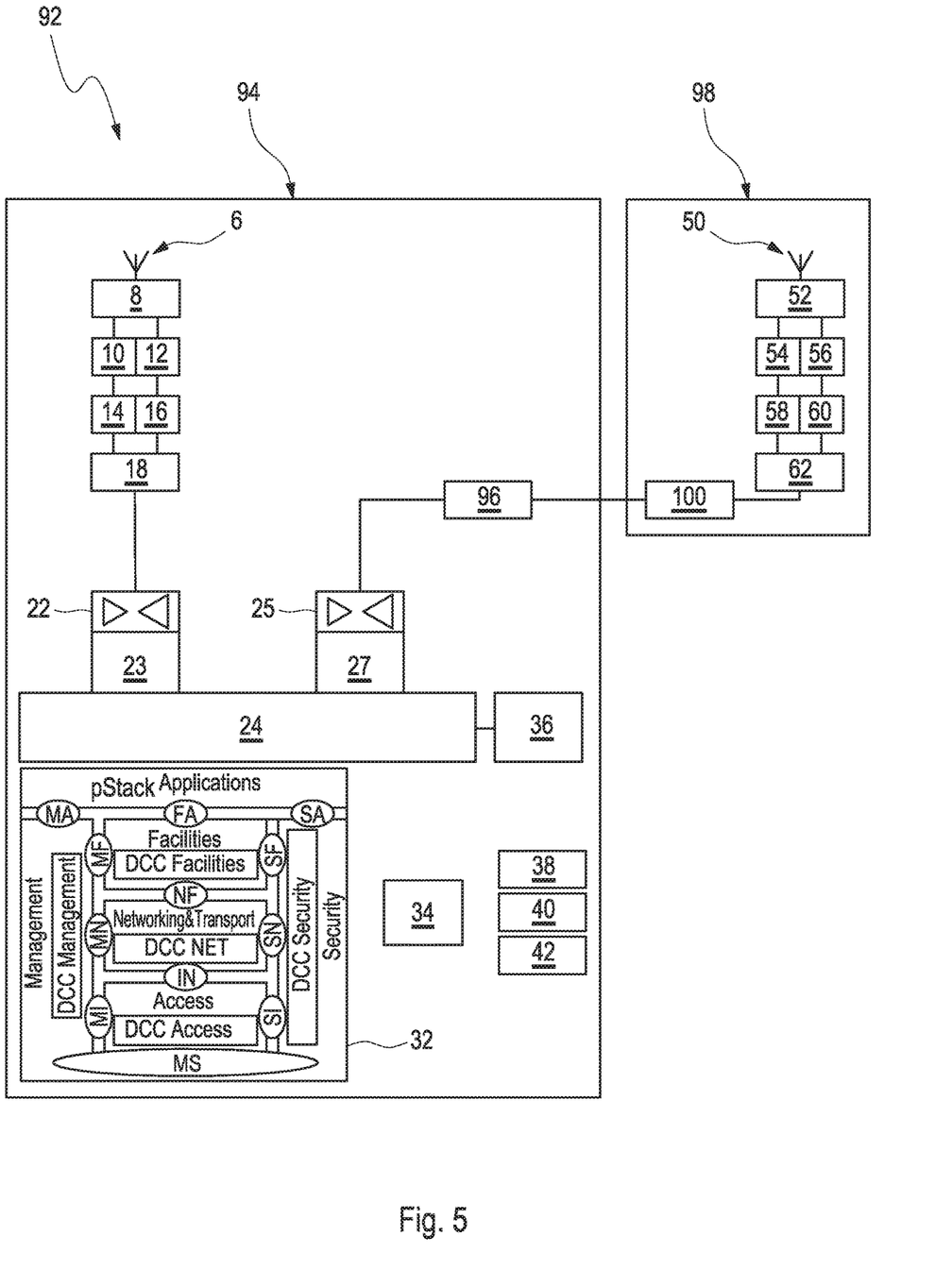
FIG. 5 shows a schematic illustration of an embodiment of an example system according to embodiments of the present disclosure.

The fifth embodiment of the system 92 for a motor vehicle for carrying out a communication between this motor vehicle and at least one further motor vehicle, shown schematically in FIG. 5, comprises a central processing unit 94 (COM information board).

In this case, the processing unit 94 comprises an antenna module 6 for transmitting and receiving signals via electromagnetic waves, which is connected to a first switch 8 for receiving and/or transmitting (Rx/Tx network switch and/or receiver/transceiver switch) the signals. The first switch 8 is upstream of a first SAW filter 10 (surface acoustic filter), a power amplifier 12 (PA), a low noise amplifier 14 (LNA) and a second SAW filter 16. In addition, the processing unit 94 comprises a second switch 18 for receiving and/or transmitting the signals. In this case, the first SAW filter 10, the power amplifier 12, the low-noise amplifier 14 and the second SAW filter 16 are arranged between the two switches 8, 18. In this case, the first switch 8, the first SAW filter 10, the power amplifier 12, the low noise amplifier 14, and the second SAW filter 16 form a signal transmission module for receiving and/or transmitting signals, which is functionally assigned to the antenna module 6.

The second switch 18 is connected to an amplifier module 22 which is designed to carry out a signal processing 23—inter alia, a synchronization of signals. In this case, as functions for the software-supported signal processing, the amplifier module 22 carries out, by way of example, an analog-to-digital conversion (ADC), a digital-to-analog conversion (DAC), a media access control (MAC), and also a first digital baseband processing and/or baseband processing (BB/DSP) of the signals. In addition, the amplifier module 22 furnishes a physical layer (PHY), a network protocol (LLC—logical link control) and SDIO IF for a signal processing 23, supported by software. The amplifier module 22 is connected to a processing core 24—in this case, a microcontroller (μC).

A second amplifier module 25 of the processing unit 94 is assigned via an Ethernet network protocol 96 (ETH/PHY) to an antenna unit 98 of the system 92, and is designed to carry out a signal processing 27.

The processing unit 94 also comprises a protocol stack 32 (pstack), which in turn is connected to a navigation system 34 for locating the motor vehicle with a global positioning system, such as GPS, a cryptography module 36 designed as an ASIC (application specific integrated circuit), a dynamic memory module 38 designed as a DRAM, and a memory module 40 designed as a flash. The processing unit 4 is connected to a network (CAN) of the motor vehicle via a connection (42).

The antenna unit 98 comprises an antenna module 50 for transmitting and receiving signals via electromagnetic waves with a first switch 52 for receiving and/or transmitting (Rx/Tx switch and/or receiver/transceiver switch) the signals. A first SAW filter 54, a power amplifier 56, a low-noise amplifier 58, and a second SAW filter 60 are connected downstream of the first switch 52. In addition, the antenna unit 98 comprises a second switch 62 for receiving and/or transmitting the signals. The first switch 52, the first SAW filter 54, the power amplifier 56, the low noise amplifier 58, the second SAW filter 60, and the second switch 62 constitute here a signal transmission module for receiving and/or transmitting signals, functionally assigned to the antenna module 50. In this case, the first SAW filter 54, the power amplifier 56, the low-noise amplifier 58, and the second SAW filter 60 are arranged between the two switches 52, 62. The antenna unit 98 also comprises an Ethernet network protocol 100 (ETH/PHY).

The second switch 62 is connected to the second amplifier module 25 via the Ethernet network protocol 100 of the antenna unit 98 and the Ethernet network protocol 96 of the processing unit 94. In this case, as functions for the software-supported signal processing, the second amplifier module 25 carries out an analog-to-digital conversion (ADC), a digital-to-analog conversion (DAC), a media access control (MAC), and also a first digital baseband processing and/or baseband processing (BB/DSP) of the signals. In addition, the amplifier module 25 provides a physical layer (PHY and/or physical layer), a network protocol (LLC and/or logical link control), and SDIO IF for signal processing 27.

The two antenna modules 6, 50 enable antenna diversity (Rx/Tx diversity), wherein a channel and/or transceiver (CCH+SCH) is provided via the processor core 24 for both of the antenna modules 6, 50. A connection between the processing unit 94 and the antenna unit 98 is based in this case on an Ethernet, taking into account an I/Q baseband.

A first motor vehicle can, to communicate with at least one second motor vehicle, have one of the presented embodiments of the system 2, 70, 74, 78, 92, wherein the first motor vehicle with the system 2, 70, 74, 78, 92 exchanges information and/or data via public WLAN (pWLAN), and optionally via Bluetooth, with the at least one second motor vehicle, via signals. It is possible that the at least one second motor vehicle also has an embodiment of the system 2, 70, 74, 78, 92.

The invention claimed is:

1. A system for a motor vehicle for exchanging information with at least one further motor vehicle in traffic, the system comprising:
a central processing unit with a processing core and a first antenna module and a second antenna module, wherein the processing core is coupled to the first antenna module and the second antenna module, wherein the first antenna module is designed to exchange signals containing information for motor vehicle-to-motor vehicle communication with at least one further motor vehicle using wireless local area network (WLAN) communication protocols, and wherein the second antenna module is designed to exchange signals containing information for motor vehicle-to-motor vehicle communication with at least one further motor vehicle using Bluetooth communication protocols; and
a software application installed in the processing core, the software application configured to provide the motor vehicle-to-motor vehicle communication via the first and second antenna modules,
wherein the processing core is designed to control each of the first and second antenna modules by carrying out a software-supported first signal processing associated with WLAN communication protocols for the first antenna module, and a software-supported second signal processing associated with Bluetooth communication protocols for the second antenna module, and
wherein data for the motor vehicle-to-motor vehicle communication is exchanged between the processing core and a protocol stack of the central processing unit.

2. The system according to claim 1, wherein the processing core is connected to each of the first and second antenna modules via a respective signal transmission module for receiving or transmitting the signals, and wherein the respective signal transmission modules have a first switch for receiving or transmitting the signals, a first SAW filter, a power amplifier, a low-noise amplifier, a second SAW filter, and a second switch for receiving or transmitting the signals.

3. The system according to claim 1, wherein at least one of the first or second antenna modules is arranged in a housing of the central processing unit or in a separate antenna unit.

4. The system according to claim 1, wherein each of the first and second antenna modules is coupled to the processing core via an amplifier module.

5. A method for a motor vehicle for exchanging information with at least one further motor vehicle in traffic, the motor vehicle comprising a central processing unit which comprises a processing core and a first antenna module and a second antenna module, wherein the processing core is connected to the first antenna module and the second antenna module, wherein an application for carrying out a motor vehicle-to-motor vehicle communication via the first and second antenna modules is installed in the processing core, the method comprising:
exchanging, by the first antenna module, signals containing information with the at least one further motor vehicle using wireless local area network (WLAN) communication protocols;
exchanging, by the second antenna module, signals containing information with at least one further motor vehicle using Bluetooth communication protocols;
controlling, by the processing core, the first antenna module by carrying out software- supported first signal processing;
controlling, by the processing core, the second antenna module by carrying out software-supported second signal processing; and
exchanging data for a communication with at least one further motor vehicle between the processing core and a protocol stack of the central processing unit.

6. The method according to claim 5, wherein controlling each of the first and second antenna modules comprises carrying out, by the processing core, at least one of a software-supported analog-to-digital conversion, a software-supported digital-to-analog conversion, a software-supported bit transmission using a physical layer simulation, a software-supported media access check, a software-supported media access control, a software-based logical connection control, or software-based baseband processing.

7. The method according to claim 5, further comprising updating software that is used for the software-supported first signal processing or the software-supported second signal processing.

8. The method according to claim 5, further comprising:
   performing, by the processing core with software support, at least one of preparing, filtering, correcting, encoding, or decoding the signals;
   compressing, by the processing core with software support, data used to provide the signals; and
   carrying out, by the processing core with software support, at least one of baseband processing or channel adjustment for exchanging the signals with the at least one motor vehicle.

\* \* \* \* \*